UNITED STATES PATENT OFFICE.

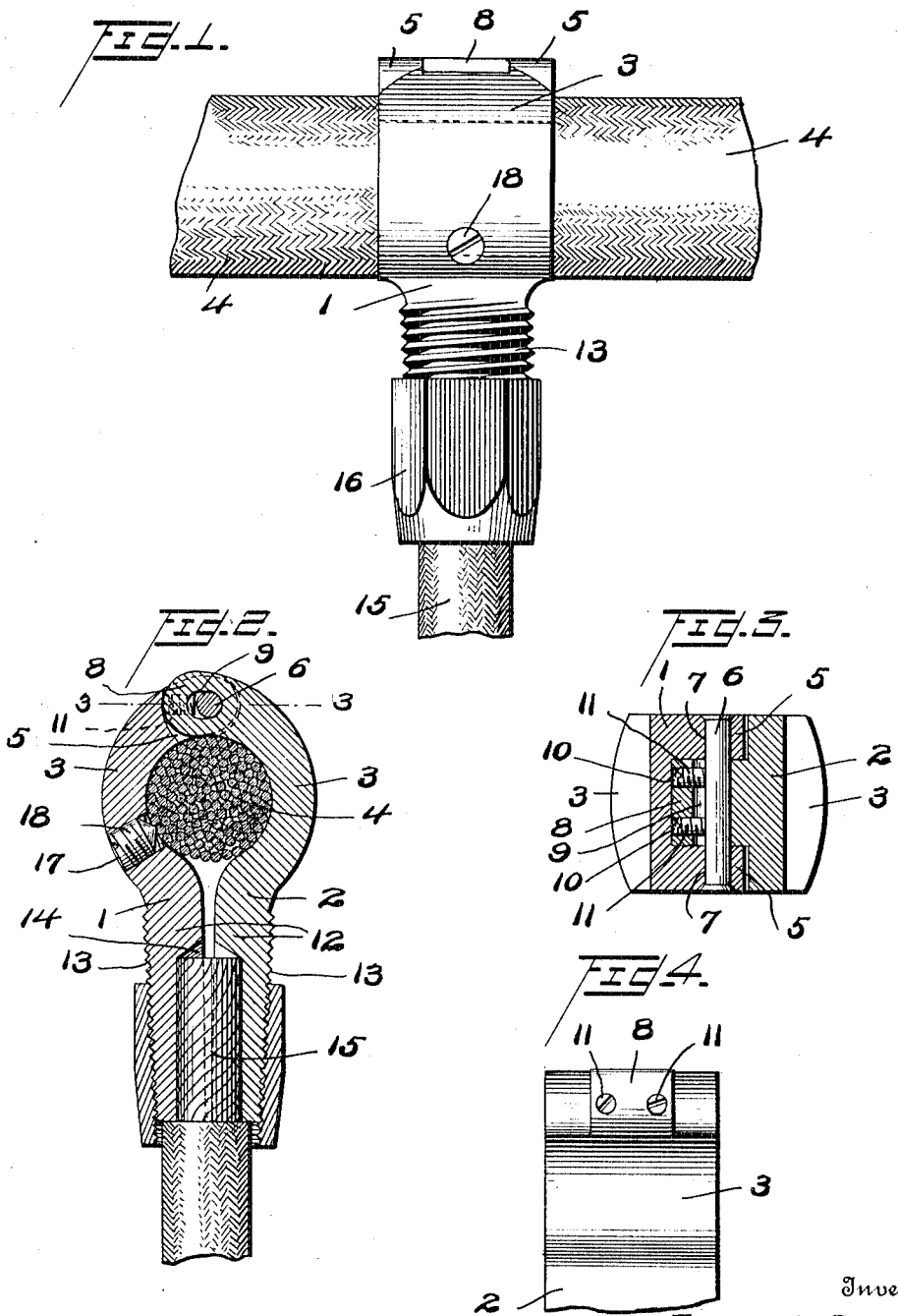

EUGENE C. BARNES, EMIL T. HAGIST, AND GEORGE NEIL, OF PHILADELPHIA, PENNSYLVANIA.

WIRE-CONNECTOR.

1,102,126.  Specification of Letters Patent.  Patented June 30, 1914.

Application filed December 3, 1913. Serial No. 804,351.

*To all whom it may concern:*

Be it known that we, EUGENE C. BARNES, EMIL T. HAGIST, and GEORGE NEIL, citizens of the United States, residing at Philadelphia, in the county of Philadelphia and State of Pennsylvania, have invented certain new and useful Improvements in Wire-Connectors, of which the following is a specification.

Our invention relates to improvements in wire connectors, the object of the invention being to provide an improved coupling which is adapted to connect the electric wires or cables permitting the coupling to be readily made without the necessity of solder or splicing.

A further object is to provide an improved connector which comprises two members adapted to clamp a cable between them and capable of adjustment to accommodate different sizes of cable and provide improved means for preventing any turning movement of the coupling or the cable relative to each other.

With these and other objects in view, the invention consists in certain novel features of construction and combinations and arrangements of parts as will be more fully hereinafter described and pointed out in the claims.

In the accompanying drawings: Figure 1 is a view in elevation illustrating our improved connector coupling and main cable with a branch. Fig. 2 is a view in longitudinal section through the connector shown in Fig. 1. Fig. 3 is a view in section on the line 3—3 of Fig. 2, and Fig. 4 is a fragmentary view in elevation illustrating the hinged end of one of the coupling members.

Our improved coupling comprises two members 1 and 2, both of which at one end are curved in semi-cylindrical form as shown at 3 to inclose the cable 4. The curved end of the member 1 is bifurcated or in other words provided with parallel ears 5 for the reception of a hinge pin 6 located in openings 7 in said ears and snugly fitting said openings. The curved end of member 2 is provided with a tongue 8 which fits between the ears 5, and is provided with an elongated slot 9 through which the pin 5 projects. Threaded openings 10 are formed in the end of tongue 8, and in these threaded openings, screws 11 are located and bear against the pin 6. By adjusting these screws 11, the position of the pin 6 in the slot 9 can be varied so that the members may snugly fit around various sizes of cable. In other words, if the coupling is to clamp around a cable larger than that shown in Fig. 2, the screws 11 can be unscrewed the necessary distance, so that the circular portions 3 of the members 1 and 2 will fit around the said larger cable, and by reason of these screws, a considerable adjustment is had so that the device may accommodate itself to the cable. The members 1 and 2 at their free ends, when together, constitute a conical split shank 12 which is externally screw-threaded as shown at 13 and internally recessed as shown at 14. A branch wire or cable 15 is securely clamped in the recesses 14 when a conical nut 16 is screwed home on the shank 12. The nut 16 therefore constitutes the clamping means for the two members 1 and 2, securely clamping them about the cable 4, and also about the cable or branch 15.

To prevent any possibility of the coupling turning on the cable or vice versa, we provide a screw-threaded opening 17 in one of the members, this opening being illustrated in member 1, and locate in said threaded opening, a pointed screw 18 which is screwed into engagement with the cable, the pointed inner end of said screw projecting between wires of the cable and operating as a positive lock, preventing any possibility of independent movement.

By providing our improved construction of members, with their novel form of hinge permitting adjustment of the coupling, we are enabled to utilize our improvements with equal facility on various sizes of cable and by reason of the locking screw 18, we can securely lock the parts together so that the electrical connection will be maintained as perfectly after a period of time as when first made. With couplings where the parts are capable of moving, the electrical connection becomes more or less defective, but by providing a positive locking screw, this is absolutely overcome.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A connector comprising a clamp consisting of two members, said members having curved portions adapted to be positioned around a cable, a hinge pin connecting the curved ends of said members, one of said members having a slot in which the pin is located, a screw in the said slotted member engaging the pin and permitting adjustment of the pin in the slot, the free ends of said members externally screw-threaded and of general conical form when together, and a conical nut screwed onto said threaded ends, substantially as described.

2. A connector comprising a clamp consisting of two members, said members having curved portions adapted to be positioned around a cable, a hinge pin connecting the curved ends of said members, one of said members having a slot in which the pin is located, a screw in the said slotted member engaging the pin and permitting adjustment of the pin in the slot, the free ends of said members externally screw-threaded and of general conical form when together, a conical nut screwed onto said threaded ends, one of said members at its curved portion having a screw-threaded opening, and a screw in said opening adapted to be projected into a cable on which the curved portions of said members are clamped, substantially as described.

3. A connector comprising two members, each member having a curved end, one member provided at its curved end with parallel ears, the other member at its curved end having a tongue located between said ears, said ears having circular pin receiving openings, said tongue having a pin receiving slot, a pin located in said openings and slot, screws in the tongue engaging the pin and limiting the movement of the pin in the slot, the free ends of said members externally screw-treaded and internally recessed, and a screw positioned on said threaded ends of the members, substantially as described.

In testimony whereof we have signed our names to this specification in the presence of two subscribing witnesses.

EUGENE C. BARNES.
EMIL T. HAGIST.
GEORGE NEIL.

Witnesses:
M. E. DITTUS,
CHAS. E. POTTS.